United States Patent
Bao et al.

[11] 3,746,352
[45] July 17, 1973

[54] RUBBING SEAL FOR HIGH TEMPERATURE CERAMICS

[76] Inventors: Vemulapalli Durganageswar Bao, 22023 Willow Court, Woodhaven; Yeshwant Pandharinath Telang, 20693 Canal Drive, Grosse Ile, both of Mich.

[22] Filed: Sept. 2, 1969
[21] Appl. No.: 854,397

[52] U.S. Cl............ 277/235 R, 106/39 R, 117/129, 277/96
[51] Int. Cl............................................. F16j 15/16
[58] Field of Search................. 117/105, 129, 70 C; 277/235, 235 A; 106/39 R; 161/207

[56] References Cited
UNITED STATES PATENTS
3,481,715   12/1969   Whalen et al.................. 117/105.2

Primary Examiner—Laverne D. Geiger
Assistant Examiner—Robert I. Smith
Attorney—John R. Faulkner and Glenn S. Arendsen

[57] ABSTRACT

A seal member designed to rub against a rotating ceramic regenerator is made by applying a surface layer consisting essentially of a glazing material such as a fluoride of lithium, sodium, potassium or calcium and a matrix material such as zinc oxide to a metal substrate. A bonding layer of nickel-aluminide can be applied to the substrate and an intermediate layer of nickel oxide and calcium fluoride can be included between the nickel-aluminide layer and the surface layer. The glazing material forms a low friction glaze at a temperature depending primarily on the composition thereof with lithium fluoride compositions producing useful glazes between about 450°–900° F., calcium fluoride compositions producing useful glazes at about 700°–1,800° F., and sodium and potassium compositions producing useful glazes in intermediate temperature ranges.

8 Claims, 3 Drawing Figures

PATENTED JUL 17 1973 3,746,352

RUBBING SEAL FOR HIGH TEMPERATURE CERAMICS

BACKGROUND OF THE INVENTION

This invention relates to sealing members of the type disclosed in U.S. Pat. application, Ser. No. 613,920, filed Feb. 2, 1967, now U.S. Pat. No. 3,481,715 and assigned to the assignee of this application.

Rotary regenerators for gas turbine engines are being made of a ceramic material capable of effective heat transfer at elevated temperatures. Typical ceramic materials useful in such regenerators include petalite, glass-ceramics, spodumene or other refractory materials having suitable high temperature properties. Cercor materials sold by Corning Glass Co. are of this type. Ordinary metal seals are incapable of surviving at the operating temperature intended for such ceramic regenerators and extensive research has been conducted to develop seals having a low coefficient of friction, low wear properties, and good sealing performance when used with the regenerator materials. Seal members made of metal oxides or carbides are capable of withstanding the expected temperatures; in general, however, these materials resulted in relatively high wear of the ceramic core.

SUMMARY OF THE INVENTION

This invention provides a seal having good oxidation resistance and a low coefficient of friction and low wear when rubbing against a ceramic regenerator. The seal comprises a metal substrate having good oxidation resistance at the anticipated temperatures and a coefficient of thermal expansion matched as closely as possible to the thermal expansion properties of the coatings applied thereto as described below. A typical steel substrate is made from nickel-chromium stainless steels such as 430SS or high temperature alloys such as Incoloy 600 or 750 sold by International Nickel Co. or Hastalloy X sold by Union Carbide Co. A surface layer consisting essentially of a glazing material and a matrix material non-abradable to the ceramic is applied to one side of the substrate where the surface layer will contact the ceramic regenerator. Glazing materials consist essentially of lithium fluoride, sodium fluoride, potassium fluoride, or calcium fluoride. Other fluorides or chlorides can be added to the glazing materials to reduce the glazing temperature and thereby lower the operating range thereof.

An intermediate layer of nickel oxide and calcium fluoride can be placed in contact with the surface layer and a bonding layer of nickel aluminide can be located between the substrate and the intermediate layer to improve bonding and prevent oxidation of the substrate. A bonding layer of nickel chromium alloy can be substituted for the nickel aluminide layer and generally permits eliminating the intermediate nickel oxide-calcium fluoride layer.

In general, glazing materials made up primarily of lithium fluoride produce a low friction, low wear glaze at temperatures between about 500° F. and 900° F. Similarly, sodium and potassium fluoride materials produce useful glazes at temperatures between about 650° – 1,100° F., and calcium fluoride materials produce useful glazes at temperatures between about 800° – 1,800° F. Adding up to about 20 weight percent of other fluorides or chlorides of lithium, sodium, potassium and calcium to the glazing materials reduces both the minimum and maximum temperatures by as much as 150° – 500° F. Such additions preferably are fluorides since the fluorides produce glazes having better overall properties.

Matrix materials useful in the surface layers include zinc oxide, cuprous oxide and stannous oxide for the lithium, sodium, and potassium fluoride glazing materials. A higher temperature glazing materal also can be used as a matrix material; for example, fluorides of sodium, potassium, and calcium can be used as matrix materials for lithium fluoride glazing materials, fluorides of potassium and calcium can be used as matrix materials for sodium fluoride, and calcium fluoride matrix material can be used with potassium fluoride glazing materials. Mixtures of these fluorides and oxides compatible with the ceramic of the regenerator also can be used as matrix materials.

Zinc oxide, cuprous oxide, stannous oxide, nickel oxide, strontium zirconate, barium zirconate or barium titanate are used as matrix materials for the high temperature calcium fluoride glazing materials. Brass or bronze powders can be used to supply matrix materials containing both cuprous oxide and zinc oxide or cuprous oxide and stannous oxide. Small amounts of carbon preferably are added to matrix materials containing cuprous oxide to prevent complete conversion of cuprous oxide to cupric oxide which increases friction considerably. The carbon generally is added as a metallic carbon composite such as a nickel carbon composite obtainable from Sherritt - Gordon Co. The nickel carbon composite contains about 25 weight percent carbon and is used in proportions ranging up to about 20 percent of the surface layer.

About 5–90 weight percent of glazing material with the balance matrix material produces surface layers having good friction, low wear, and good adhesion to the bonding or intermediate layers. The minimum temperature at which the glazing material produces the glaze can be lowered by using eutectic mixtures of the glazing material and the matrix material.

Each of the layers can be applied by a plasma spraying technique. The bonding layer is prepared by mixing powders of the ingredients and spraying the powder onto a fully annealed or aged substrate. An intermediate layer is applied by ball milling nickel oxide and calcium fluoride powders free of iron compounds, sintering the mixture at 2,500° to 3,000° F. in an inert or slightly oxidizing atmosphere made up primarily of nitrogen, argon, xenon, or helium that prevents any reduction of nickel oxide, dry grinding the sintered product, and spraying the resulting powder on the bonding layer. An inert atmosphere prevents any formation of calcium oxide and is preferred. Plasma spraying with an inert gas also is preferred. Surface layers are prepared in much the same manner from powders of the appropriate components. Intermediate and surface layers also can be prepared by mixing powders with a suitable binder such as gum arabic or polyvinyl alcohol in a water base slurry and agglomerating the mixture in a spray drier. The resulting mixture is applied to a substrate and heated to burn off the binder.

At the operating temperatures and pressures encountered in the regenerator environment of a gas turbine engine, the glazing materials develop a glaze surface on the seal member that has satisfactory friction and wear when rubbing against a ceramic regenerator. Friction coefficients below about 0.45 are considered to be satisfactory for use in the gas turbine engine. Small amounts of the glazing materials can transfer onto the rubbing surface of the regenerator to produce a similar glaze there which reduces wear rates. Materials such as boric oxide that are detrimental to the ceramic regenerator core are avoided in any of the layers of the seal. The best combination of friction, wear and seal integrity is provided by surface layers comprising lithium fluoride glazing material and zinc oxide matrix material for temperatures between about 450° – 900° F. and by calcium fluoride - zinc oxide surface layers for higher temperatures.

DETAILED DESCRIPTION

Figure 1:
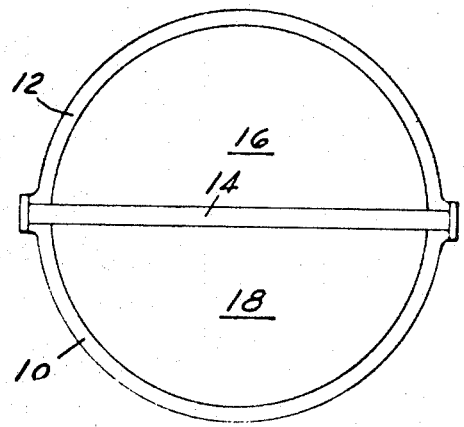
FIG. 1 is a plan view of a regenerator seal of this invention showing the two semi-circular peripheral seal members and the diagonal cross arm seal member.

Referring to the drawings, a seal assembly for a disc type rotating regenerator of a gas turbine engine comprises two semi-circular rim seals 10 and 12 separated by a straight cross arm seal 14. The seal assembly is mounted in the housing of a gas turbine engine and a disc type regenerator is mounted for rotation on top of the seal assembly with the lower surface of the regenerator sliding on the seal assembly. During engine operation, relatively cool gases from the engine compressor flow downward through the sector of the regenerator above passage 16 and into passage 16 which conducts the gases to the engine combustion chambers. Hot combustion gases flow upward through passage 18, through the sector of the regenerator above passage 18, and out the engine exhaust port (not shown). Rotation of the regenerator transfers heat from the hot combustion gases leaving passage 18 to the relatively cool gases entering passage 16.

Figure 2:
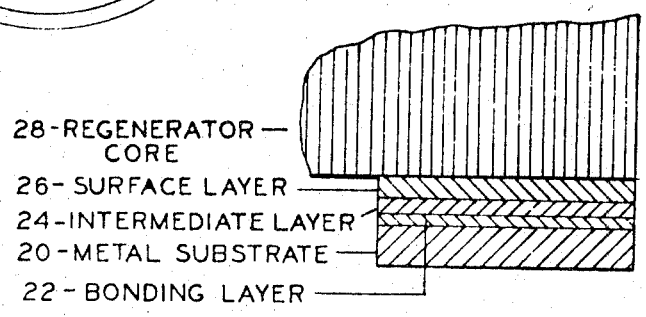
FIG. 2 is a cross-section of a four component seal member having a nickel-aluminide bonding layer, a nickel oxide-calcium fluoride intermediate layer and a surface layer.

As shown in FIG. 2, any of seal members 10, 12 or 14 comprise a substrate 20 having a bonding layer of nickel-aluminide 22 on one surface. An intermediate layer 24 consisting essentially of nickel oxide and calcium fluoride is located on top of bonding layer 22. Intermediate layer 24 preferably is about 0.003 inch – 0.010 inch thick and preferably consists of about 55–95 weight percent nickel oxide with the remainder calcium fluoride.

Figure 3:
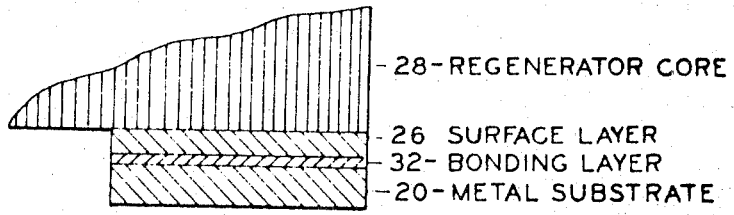
FIG. 3 is a cross-section of a three component seal member having a nickel chromium bonding layer and a surface layer.

A surface layer 26 is located on top of intermediate layer 24. Good results are obtained with a surface layer about 0.005 – 0.050 inch thick and containing about 10–90 weight percent glazing material with the balance matrix material. Best friction and wear properties are obtained with about 10–40 weight percent glazing material. In the alternate construction shown in FIG. 3, a bonding layer 32 consisting essentially of a nickel-chromium alloy is applied to one surface of substrate 20 and surface layer 26 then is applied directly to bonding layer 32. Cross arm seal member 14 generally operates at a higher temperature than peripheral seals 10 and 12, and surface layers for the cross arm seal use calcium fluoride glazing materials. Lithium, sodium, or potassium fluoride glazing materials or glazing materials containing calcium fluoride plus one of the other fluorides usually are used in the surface layers of the peripheral seals.

EXAMPLE I

A bonding layer of nickel-aluminide is applied to a 430SS stainless steel substrate by mixing powders of nickel and chromium together in a ball mill and flame spraying the mixture onto the substrate. 60 weight parts of copper powder are ball milled with 40 weight parts of lithium fluoride powder to obtain a mixture having a particle size of −170 to +325 mesh. This mixture is flame sprayed onto the bonding layer in an inert atmosphere to obtain a surface layer having a thickness of about 0.025 – 0.030 inch. The seal member then is placed in an oxidizing atmosphere at about 500° – 650° F. for about 2 hours to convert the copper powder to cuprous oxide matrix material and the surface layer is ground to approximately a 170 rms finish.

The resulting seal member is installed in a test rig in which a ceramic regenerator is loaded onto the surface layer of the seal with a load of about 7 psi. At 500° F. the friction coefficient of the regenerator-seal arrangement averaged about 0.12 – 0.15 and the wear rate of the surfaces averaged about 0.0007 inch per 100 hours. At 600° F. friction coefficients were 0.12 – 0.18 and wear rates were 0.0005 – 0.001 inch per 100 hours. At 750° F. friction coefficients were 0.2 – 0.4 and wear rates were 0.0015 inch per 100 hours. Analysis revealed that the increased friction and wear at 750° F. resulted from conversion of most of the cuprous oxide to cupric oxide. The seal member was considered satisfactory for use at temperatures below about 700° F.

EXAMPLE II

A surface layer of 80 weight parts copper and 20 weight parts lithium fluoride was prepared in the manner of Example I. At 600° F. in the test rig, the seal member has a coefficient of friction of 0.15 and a wear rate of 0.0005 inch per 100 hours.

EXAMPLE III

About 10 weight parts of a nickel carbon composite (75 weight percent nickel and 25 weight percent carbon) were added to 90 weight parts of the powder used to make the surface layer of Example I, and a seal member was made with a surface layer of the resulting mixture. At 750° F. in the test rig, the seal member had a friction coefficient of 0.2 and a wear rate of 0.0008 per 100 hours. Analysis showed that the reduced friction and wear rate at the test temperature was caused by the inhibiting effect of the carbon on the formation of cupric oxide.

EXAMPLE IV

A 430SS steel substrate was flame sprayed with a powder of nickle and aluminide to produce a bonding layer of nickel-aluminide. 80 weight parts of high purity nickel oxide powder was mixed with 20 weight parts of calcium fluoride powder in a ball mill for about 4–12 hours. Both powders initially had a particle size of −170 to +325 mesh. After milling, the mixture was sintered in an inert atmosphere at 2,500°–3,000° F. and the sintered product was ground to produce a powder having a particle size of −100 to +400 mesh. Sintering was carried out carefully to prevent reduction of the nickel oxide and formation of calcium oxide. The resulting mixture was flame sprayed onto the bonding layer to produce an intermediate layer.

A surface layer was produced by mixing in a ball mill the powder used to produce the intermediate layer with about 10 weight percent of dry potassium chloride powder having a corresponding particle size. The resulting mixture is flame sprayed onto intermediate layer 24 to produce a surface layer containing 72 weight percent nickel oxide, 18 weight percent calcium fluoride and 10 weight percent potassium chloride and having a thickness of about 0.020 inch. A surface finish of about 40 rms was produced on the surface layer by dry grinding.

At 500°–700° F. in the test rig, this seal generated a friction coefficient of about 0.4 – 0.25 and displayed a wear rate of 0.001 inch per 100 hours. The friction coefficient dropped to about 0.12 at 800° F. and to about 0.10 at 900° F. while the wear rate dropped slightly. For purposes of comparison a surface layer prepared according to this example but lacking potassium chloride exhibited friction coefficients in excess of 0.45 at temperatures below 800° F. Thus the addition of potassium chloride reduced the lower threshold of the useful temperature range by about 500° F.

EXAMPLE V

A surface layer of 80 weight percent strontium zirconate as the matrix material and 20 weight percent calcium fluoride as the glazing material was substituted for the surface layer of Example IV. Friction coefficients ranged from 0.4 to 0.35 and wear rates averaged about 0.001 inch per 100 hours at temperatures between 700 and 1,400° F. Similar results were obtained at 1,400° F. when barium titanate was substituted for the strontium zirconate. Substituting barium zirconate for the strontium zirconate produced approximately the same coefficient of friction and a wear rate of about 0.003 inch per 100 hours at 1,400° F.

EXAMPLE VI

A surface layer of 80 weight percent zinc oxide as the matrix material and 20 weight percent calcium fluoride as the glazing material was substituted for the surface layer of Example IV. At 1,400° F. the friction coefficient was about 0.3 and the wear rate was about 0.003 inch per 100 hours.

Thus this invention provides seals for use against a ceramic regenerator that have both satisfactory friction and long life at the temperatures and in the highly corrosive gases encountered in the engine. The seals have a low wear rate when rubbing against the ceramic regenerator and maintain seal integrity despite the widely varying temperatures encountered in the engine.

What is claimed is:

1. A seal member having a low coefficient of friction and low wear when rubbing against a ceramic material at temperatures above about 500° F. comprising a metal substrate having a surface layer attached to one surface for rubbing against said ceramic material, said surface layer consisting essentially of a glaze producing material selected from the group consisting of lithium fluoride, sodium fluoride, and potassium fluoride and a non-abradable matrix material selected from the group consisting of zinc oxide, cuprous oxide, stannous oxide, calcium fluoride, potassium fluoride and sodium fluoride, any of said fluorides in said matrix material having a glazing temperature higher than the glazing temperature of said glaze producing material.

2. The seal member of claim 1 in which the glaze producing material consists essentially of lithium fluoride.

3. The seal member of claim 2 in which the matrix material consists essentially of zinc oxide.

4. The seal member of claim 3 in which the surface layer contains about 10–40 weight percent glazing material and the balance matrix material.

5. The seal member of claim 1 in which the surface layer contains about 10–40 weight percent glazing material and the balance matrix material.

6. A seal member having a low coefficient of friction and low wear when rubbing against a ceramic material at temperatures above 700°F. comprising a metal substrate having a surface layer attached to one surface, said surface layer consisting essentially of a glaze producing material containing calcium fluoride and a non-abrading matrix material selected from the group consisting of zinc oxide, cuprous oxide, barium zirconate, strontium zirconate, and barium titanate, said surface layer being free of calcium oxide.

7. The seal member of claim 6 in which the matrix material is zinc oxide.

8. The seal member of claim 6 in which the surface layer contains about 10–40 weight percent of glaze producing material with the balance matrix material.

* * * * *

UNITED STATES PATENT OFFICE
CERTIFICATE OF CORRECTION

Patent No. 3,746,352          Dated July 17, 1973

Inventor(s)   V. D. Rao et al

It is certified that error appears in the above-identified patent and that said Letters Patent are hereby corrected as shown below:

Title Page, Column 1, line 3, cancel "Vemulapalli Durganageswar Bao" and substitute --Vemulapalli Durganageswar Rao--.

Signed and sealed this 1st day of October 1974.

(SEAL)
Attest:

McCOY M. GIBSON JR.
Attesting Officer

C. MARSHALL DANN
Commissioner of Patents